Feb. 25, 1930.                F. SCHRADER                 1,748,680
                      OIL CAN WITH INSERTABLE NOZZLE
                           Filed June 28, 1927
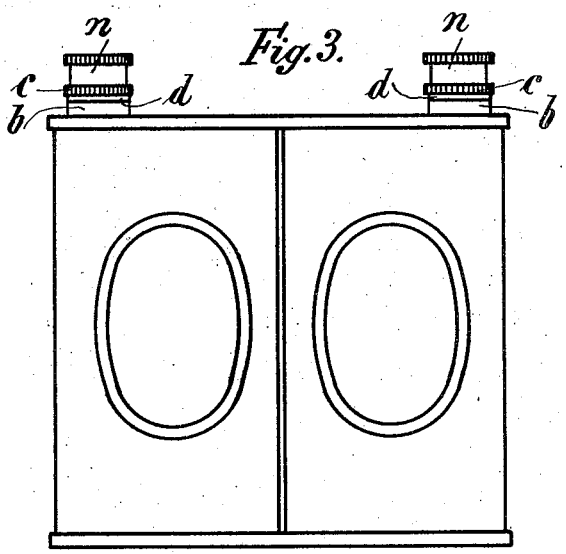
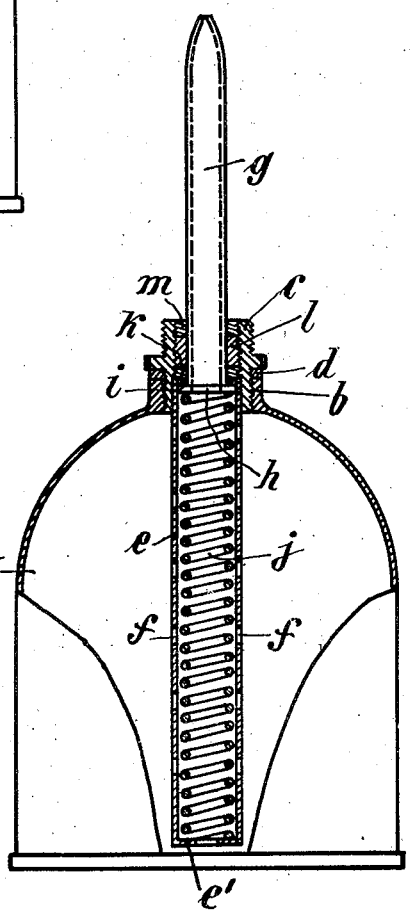
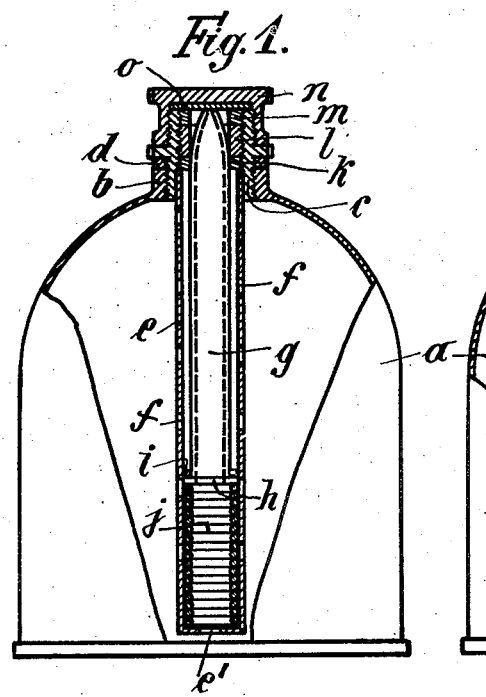

Patented Feb. 25, 1930

1,748,680

UNITED STATES PATENT OFFICE

FRIEDRICH SCHRADER, OF HEUDEBER, NEAR HALBERSTADT, GERMANY

OIL CAN WITH INSERTABLE NOZZLE

Application filed June 28, 1927, Serial No. 202,102, and in Germany March 23, 1927.

This invention relates to an improved oil can, and its object is to provide the same with an insertable nozzle, that is held in its inserted position by means of a screw-cap while after removal of the latter said nozzle is automatically projected by spring action out of the can into its position of use, means being provided for guiding the nozzle within the oil can.

In the accompanying drawing: Figs. 1 and 2 are longitudinal sections through an oil can with the nozzle in its inserted position and in its position of use, respectively, while Fig. 3 shows a double oil can with two nozzles, one for oil and the other for benzine.

The oil can $a$ carries an internally screw-threaded collar $b$ into which a flanged bushing $c$ is screwed that bears upon said collar by means of a sealing washer $d$. Said bushing carries a depending tube $e$ with closed end $e'$ and with perforations $f$ uniformly distributed all over its length and circumference so as to be in communication with the interior of the can. In said tube the nozzle $g$ is guided by means of a flange $h$ at its inner end, against which bears a pressure-spring $j$ located and guided in said tube and against the action of which the nozzle $g$ can be inserted in the oil can and secured in its inserted position (Fig. 1) by means of a screw-cap $n$ screwed over said bushing $c$ and having a sealing washer $o$ therein. Guide-rings $k$ and $m$, with a packing ring $l$ between them, screwed in the internally screw-threaded bushing $c$ serve for guiding the nozzle $g$ during its passage through the bushing $c$. A sealing washer $i$ on the flange $h$ of the nozzle $g$ serves to bear against the guide-ring $k$ in the position of use of the nozzle $g$. When removing the screw-cap $n$ the nozzle $g$ is automatically projected into its position of use by action of the spring $j$.

Fig. 3 shows an oil can with two compartments, one for oil and the other for benzine, each fitted with an insertable nozzle held in its inserted position by means of a screw-cap $n$ screwed over the pushing $c$ in the collar $b$.

What I claim, is:—

An oil can, comprising in combination an internally screw-threaded collar forming the mouth of said can, a washer on said collar, an internally and externally threaded bushing screwed in said collar, a flange on the central portion of said bushing bearing tightly upon said washer, a cap adapted to be screwed on the upper projecting end of said bushing and to seat tightly on the upper surface of said flange thereby closing said can, two guide rings screwed in said bushing, a packing ring between said guide rings, a perforated tube closed at the lower end depending from said bushing into said can, a nozzle slidably mounted in said tube guided in said guide rings and an outwardly directed flange on the lower end of said nozzle, adapted to limit the outward displacement of said nozzle, a spiral spring between said nozzle and the bottom of said tube and a washer on the underside of the lowermost of said guide rings adapted to form a tight joint with the upper surface of the flange of said nozzle when the latter is projecting from said bushing.

In testimony whereof I have hereunto set my hand.

FRIEDRICH SCHRADER.